United States Patent [19]

Mizuno et al.

[11] 4,252,480
[45] Feb. 24, 1981

[54] THROW AWAY INSERT AND END MILLS

[75] Inventors: Tsuyoshi Mizuno, Toyoda; Shigetada Yoneyama, Gifu, both of Japan

[73] Assignee: Sumitomo Electric Industries, Ltd., Osaka, Japan

[21] Appl. No.: 35,901

[22] Filed: May 3, 1979

[51] Int. Cl.³ .......................... B23B 51/00; B26D 1/12
[52] U.S. Cl. ...................... 408/223; 407/54; 407/113
[58] Field of Search ............... 408/223, 224, 227, 228, 408/229, 230, 713; 407/41, 48, 54, 62, 113, 114

[56] References Cited

U.S. PATENT DOCUMENTS

| 3,213,716 | 10/1965 | Getts | 408/713 |
| 3,380,137 | 4/1968 | MacPetrie | 407/113 |
| 3,670,380 | 6/1972 | Moore et al. | 407/48 |
| 3,896,532 | 7/1975 | Brooks | 407/113 |
| 3,927,447 | 12/1975 | Willinger | 407/48 |
| 4,116,580 | 9/1978 | Hall et al. | 408/230 |
| 4,124,328 | 11/1978 | Hopkins | 408/223 |
| 4,132,493 | 2/1979 | Hosoi | 408/230 |

Primary Examiner—Harrison L. Hinson
Attorney, Agent, or Firm—Wenderoth, Lind & Ponack

[57] ABSTRACT

Improved throw away insert and end mills suitable for use with such an insert. The throw away insert has cutting edges which have a convex arcuate shape and have an identical radius of curvature larger than that of the circle circumscribing it at the noses thereof.

4 Claims, 8 Drawing Figures

THROW AWAY INSERT AND END MILLS

The present invention relates to an improved throw away insert and a ball end mill and a radius end mill for use with said throw away insert.

A solid or brazed ball end mill or radius end mill has heretofore been employed. However, the use of a conventional round throw away insert with a conventional end mill causes some problems. Firstly, the radius of curvature of such a throw away insert is too small with respect to that of the end of the end mill for the cutting edge thereof to cover a desired radius. Secondly, it is difficult to securely clamp a large round throw away insert on an end mill having a small diameter because of the limited mounting space.

It is an object of the present invention to provide a throw away insert which obviates these shortcomings and is suitable for use with an end mill.

It is another object of the present invention to provide an end mill on which a plurality of the throw away inserts according to the present invention can be clamped in such positions as to generate a hemisphere with a desired radius of curvature.

Other objects and features of the present invention will become apparent from the following description taken with reference to the accompanying drawings, wherein.

Figure 1:
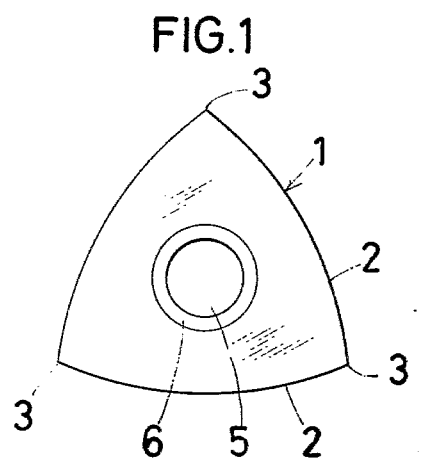
FIG. 1 is a plan view of the throw away insert according to the present invention.
Figure 3:
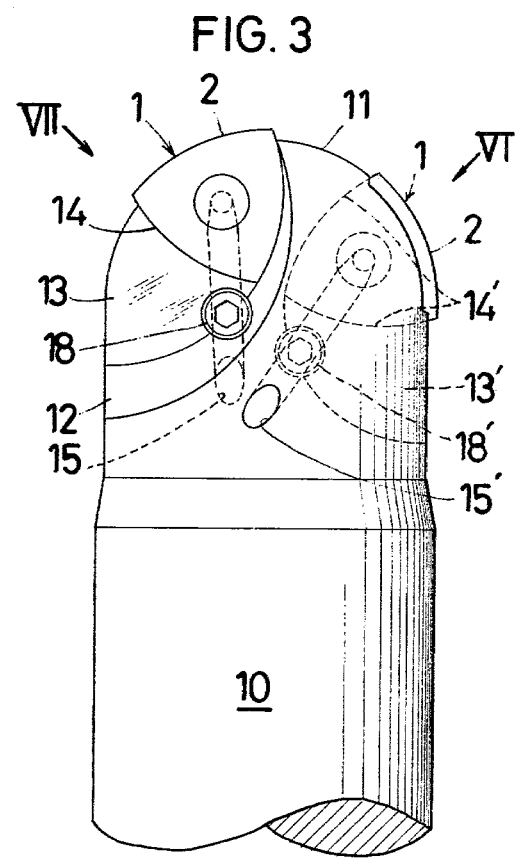
FIG. 3 is a front elevation view of a ball end mill according to this invention.
Figure 2:
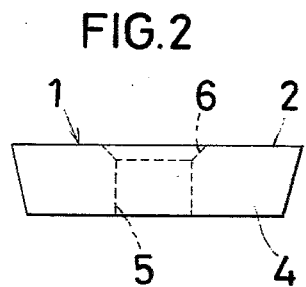
FIG. 2 is a side view thereof.
Figure 4:
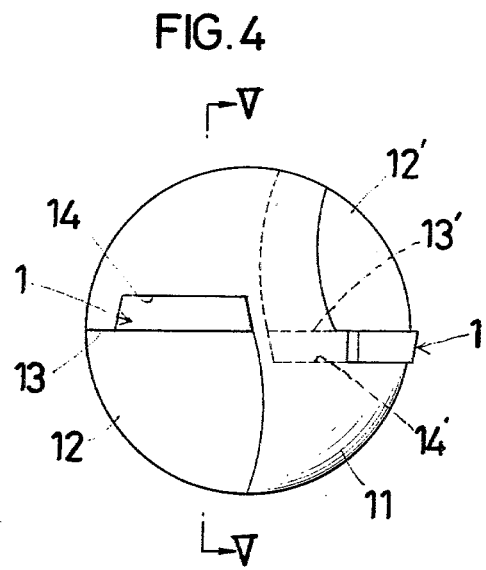
FIG. 4 is a plan view thereof.
Figure 5:
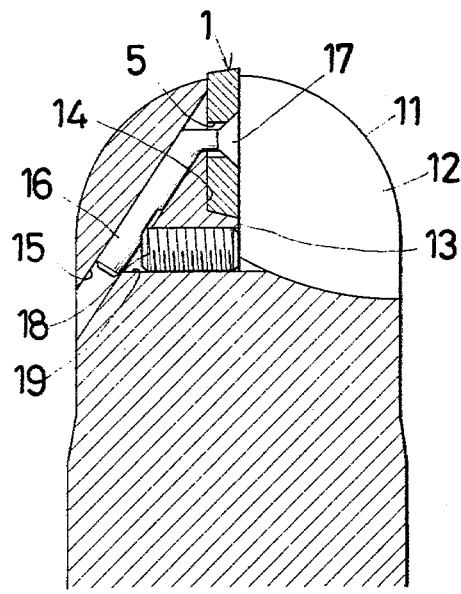
FIG. 5 is a sectional view taken along the line V—V of FIG. 4.
Figure 6:
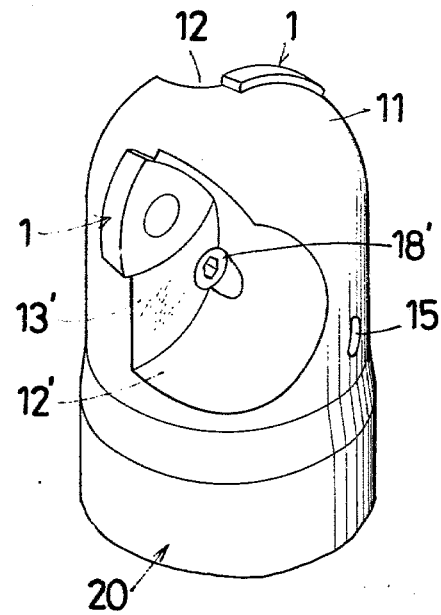
FIG. 6 is a perspective view as seen from the direction VI of FIG. 3.
Figure 7:
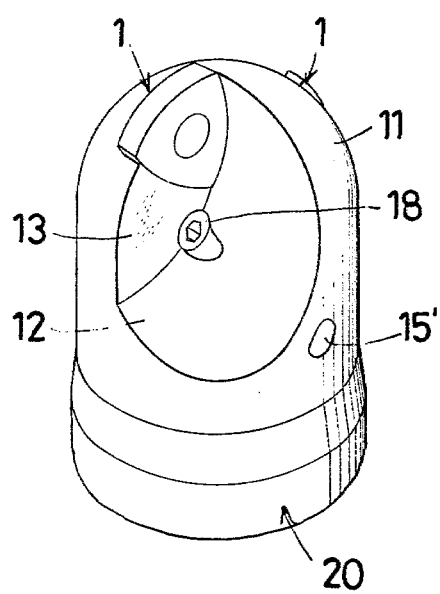
FIG. 7 is a perspective view as seen from the direction VII of FIG. 3.

Referring first to FIGS. 1-2, the insert 1 according to the present invention is of a substantially regular triangular shape and has a cutting edge 2 with an identical convex arcuate shape at each intersection of a side face 4 with the top surface. The radius of curvature of each cutting edge is larger than that of an imaginary circle which circumscribes the insert 1 at the noses 3 thereof.

Advantageously, the insert 1 may have in its center a clamp hole 5 which is beveled at one end thereof to form a tapered surface 6. However, the clamp hole 5 with the tapered surface is not essential because the insert can be clamped in any other conventional manner than the particular one described later.

The throw away insert 1 according to the present invention may be provided on the top surface thereof with positive lands, chip breaker grooves, or any other desired means, of course.

Referring next to FIGS. 3-7, the ball end mill according to the present invention has a body 10 and a hemispherical end 11 having two pockets 12 and 12' angularly displaced from each other. The pockets 12 and 12' have flat surfaces 13 and 13', respectively, which are on substantially the same plane passing through the axis of the body 10.

The straight surfaces 13 and 13' are provided at their top with recesses 14 and 14', respectively, to receive the throw away insert 1 according to the present invention. The recesses 14 and 14' have a depth such that when the inserts 1 are clamped therein, the top surface of the insert will be flush with the flat surface 13 and 13' and have a size such that the cutting their top edge 2 will project slightly and uniformly above the end surface 11.

The position of the recesses 14 and 14' is such that the cutting edges of the two throw away inserts 1 are disposed at different distances from the end of the end 11 so that when the mill body 10 is rotated about its axis, the two cutting edges will generate a hemisphere having substantially the same radius of curvature as that of each cutting edge.

The mechanism for clamping the insert according to the present invention will be described later. Clamp pin holes 15 and 15' are provided in the mill body 10 so as to extend obliquely from the outer periphery thereof and communicate with the recesses 14 and 14', respectively. To clamp the insert 1 in the recess 14, for example, a clamp pin 16 which is substantially an L-shape pin is inserted in the center hole 5 of the insert 1 until the tapered head of the clamp pin is seated on the tapered surface 6 in the center hole 5. The clamp pin 16 is inserted into the clamp pin hole 15 until the insert 1 is mounted in the recess 14. A setscrew 18 is then threaded into a threaded hole 19 provided in the mill body so as to extend from the straight surface 13 to the clamp pin hole 15. The setscrew is firmly tightened until its forward end engages the clamp pin 15 in a recess formed therein to clamp it in the hole 15.

The above-mentioned described clamping mechanism is advantageous in that the insert can be fixedly clamped in a limited space and that it does not interfere with chip ejection during cutting. However, it may be replaced with any other suitable clamping mechanism.

Figure 8:
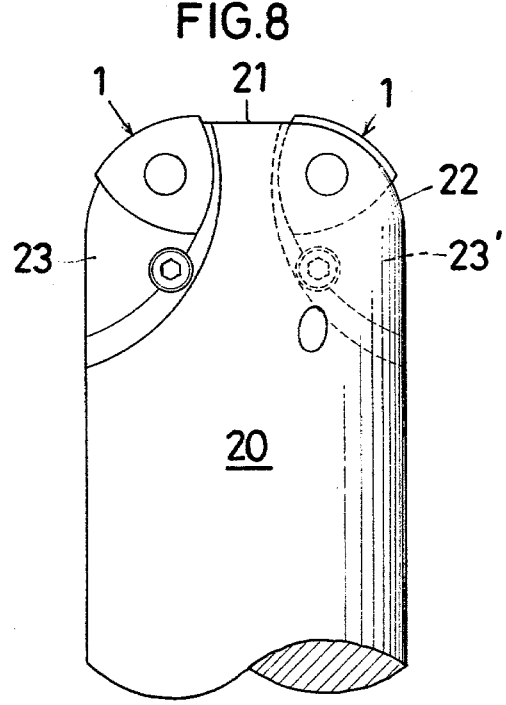
FIG. 8 is a front elevation view of a different embodiment of a radius end mill according to the present invention.

Referring to FIG. 8, a radius end mill according to the present invention has a body 20, the end of which has a circular flat surface 21 in the center thereof and a spherical surface 22 which extends from the flat surface 21 toward the outer periphery of the body 20. Two pockets 23 and 23' are provided symmetrically to each other in the spherical surface 22. These pockets also are provided with recesses similar to the recesses 14 and 14' of the ball end mill of FIGS. 3-7 to receive the insert 1 according to the present invention. The insert 1 can be clamped in each recess by means of the above-described clamping mechanism.

Both the ball end mill and the radius end mill according to the present invention may be adapted to carry three or more inserts instead of two, if desired.

It will be understood from the foregoing that the throw away insert according to the present invention has the advantage that, due to its shape, it has cutting edges with a relatively large radius of curvature in spite of its small size and that its small size solves the difficlty in clamping it on an end mill.

It will also be understood from the foregoing that due to the arrangement in which two throw away inserts are suitably displaced from each other at different distances from the end of the mill, the ball end mill according to the present invention can generate a hemisphere with substantially the same radius as that of the cutting edge of the throw away insert with a minimum of two inserts.

The clamping mechanism employed in this invention permits steady and easy clamping of the throw away inserts with a limited space without interfering chip ejection.

Although the present invention has been described with reference to the preferred embodiment, it will be understood that many changes or variations can be made within the scope of the invention.

What we claim:

1. A cutting tool comprising: a body member rotatable around an axis extending longitudinally therethrough, a cutting end of said body having at least two recesses therein, a cutting insert mounted in each recess and having a cutting edge projecting beyond the profile of the cutting end of said body, said cutting edges lying in an imaginary surface extending from the side surface of said body at least part way to the end surface at said axis and curved with a shape generated by rotating of a curved line around said axis, the projecting cutting edges of said inserts lying at different distances from the end surface at said axis, the cutting edge of the cutting insert closest to the end of the cutting tool having the end which is remote from the end of the cutting tool at an angular position corresponding to the angular position of the end of the cutting edge of the other insert which is closest to the end of the cutting tool, whereby when the cutting tool is rotated against a workpiece, a recess is produced having a curved surface corresponding to the curved surface generated by the rotation of said curved line around said axis of said cutting tool and along which said cutting edges of said inserts move during rotation of said cutting tool.

2. A cutting tool as claimed in claim 1 in which said line is part of a circle.

3. A cutting tool as claimed in claim 1 in which said line is part of a circle and extends from the side surface of said cutting tool substantially to the end surface of said cutting tool at said axis.

4. A cutting tool as claimed in claim 1 in which said cutting insert has a substantially regular triangular shape with each side constituting a cutting edge, all of the cutting edges having a convex shape with the same radius of curvature and the radius of curvature being larger than the radius of a circle circumscribing said insert and tangent to the apexes of the triangular shape.

* * * * *